United States Patent
Wu et al.

(10) Patent No.: US 6,716,750 B2
(45) Date of Patent: Apr. 6, 2004

(54) SYSTEM AND METHOD FOR PROCESSING RESIDUAL GAS

(75) Inventors: Cheng-ta Wu, Hsin-chu (TW); Chang-Cheng Chen, Hsin-chu (TW); Chun-Chi Chen, Taipei (TW)

(73) Assignee: ProMos Technologies, Inc., Hsinchu (TW)

( * ) Notice: Subject to any disclaimer, the term of this patent is extended or adjusted under 35 U.S.C. 154(b) by 0 days.

(21) Appl. No.: 09/886,010

(22) Filed: Jun. 22, 2001

(65) Prior Publication Data

US 2002/0040641 A1 Apr. 11, 2002

(30) Foreign Application Priority Data

Aug. 28, 2000 (TW) ........................................ 89117367 A

(51) Int. Cl.$^7$ ............................................... H01L 21/44
(52) U.S. Cl. ...................... 438/680; 422/168; 422/169; 422/175; 422/202; 422/198; 96/372; 423/210
(58) Field of Search ......................... 96/372, 370, 367; 423/210; 422/168, 169, 170, 171, 172, 173, 174, 175, 176, 177, 178–184.1, 202, 205, 245, 251, 198; 438/680, 800

(56) References Cited

U.S. PATENT DOCUMENTS

| | | | | | |
|---|---|---|---|---|---|
| 5,335,609 | A | * | 8/1994 | Nelson et al. | 110/245 |
| 5,521,263 | A | * | 5/1996 | Seeger et al. | 526/68 |
| 5,955,037 | A | * | 9/1999 | Holst et al. | 422/171 |
| 6,322,756 | B1 | * | 11/2001 | Arno et al. | 422/171 |
| 6,423,284 | B1 | * | 7/2002 | Arno et al. | 423/240 |

* cited by examiner

*Primary Examiner*—Matthew Smith
*Assistant Examiner*—Renzo N Rocchegiani
(74) *Attorney, Agent, or Firm*—Finnegan, Henderson, Farabow, Garrett & Dunner, L.L.P.

(57) ABSTRACT

A system for processing residual gas that includes a chamber having at least one baffle for increasing gas flow path, a residual gas inlet mechanism connected to the chamber for supplying residual gas to the chamber, at least one first gas inlet mechanism connected to the chamber for supplying inert gas to the chamber, at least one second gas inlet mechanism connected to the chamber for supplying a reactive gas to the chamber, and a gas outlet mechanism connected to the chamber for outputting mixed gases from mixing the residual gas, inert gas and reactive gas and non-reacted residual gas, inert gas and reactive gas.

9 Claims, 3 Drawing Sheets

SYSTEM AND METHOD FOR PROCESSING RESIDUAL GAS

BACKGROUND OF THE INVENTION

1. Field of the Invention

This invention pertains in general to a system and method for processing residual gas and, more particularly, to a system and method for processing and disposing of residual toxic gas in a semiconductor manufacturing process.

2. Description of the Related Art

A variety of process gases are used in various process equipment in a semiconductor manufacturing process. For example, a Chemical Vapor Deposition (CVD) process often uses $SiH_4$, $B_2H_6$, $NH_3$ and $H_2$ as process gases. Because many process gases are toxic and explosive, and because process gases are seldom completely reacted during a manufacturing process, handling of residual gases, i.e., process gases that remain after completion of the manufacturing process, is an important issue in semiconductor manufacturing. In addition, environmental concerns and government legislating prohibit toxic gases and harmful particles from being vented to the atmosphere or disposed of with waste water.

FIG. 1 is a flow chart of a conventional process for handling residual gas in a semiconductor manufacturing process that uses silane ($SiH_4$) as the processing gas. Referring to FIG. 1, process gas, for example, silane, is selected at step 1. Some of the characteristics of silane gas are described in the following table:

| Molecule | Name | Atomic Weight | Color | Smell | Boiling point (° C.) |
|---|---|---|---|---|---|
| $SiH_4$ | Silane | 32 | None | Repulsive | −112 |

| Melting Point (° C.) | Density (g/L) | Status in Room Temperature | Safety Characteristics | Toxic Indication** | |
|---|---|---|---|---|---|
| −185 | 0.68 | Gas | E/F/P* | TLV 5 ppm | IDLH — |

*E: explosive; F: inflammable; P: toxic
**TLV: Threshold Limit Value (time weighted average exposure for an 8-hour day in a 40-hour workweek)

IDLH: Immediate Danger to Life and Health

Source: R. J. Lewis, Sr., Hazardous Chemicals Desk Reference, $3^{rd}$ Ed., Van Nostrand Reinhold, 1993.

These characteristics show that silane is toxic and explosive, and therefore great care should be taken in handling and disposing of silane gas. The process gas is then introduced at step 10 to a process chamber through a connecting pipe. After a semiconductor manufacturing process is performed in the process chamber at step 10, a pump propels the remaining silane gas that did not fully react during the process, i.e., the residual gas, from the process chamber to a wet scrubber through another connecting pipe at step 20. As described above, the residual gas introduced to the wet scrubber still contains non-reacted silane gas. Upon entering the wet scrubber, oxidation ensues and powdered silicon dioxide ($SiO_2$) is formed. Water is then added to the wet scrubber so that both soluble and non-soluble $SiO_2$ powders are further processed at a waste water facility drain at step 42. The resultant waste water is expelled to the environment. Any remaining residual gas and powders are vented at step 40 to a waste gas facility exhaust to be further processed and then be expelled into the atmosphere.

This conventional technique, however, cannot ensure that all of the silane gas that passes through the wet scrubber is reacted. Therefore, an explosion is still possible if the silane gas were to come into contact with oxygen in one of the connecting pipes. Furthermore, the non-reacted silane gas expelled to the atmosphere may still exhibit a toxic level higher than the legally prescribed safety level. In addition, the powders produced through oxidation of the silane gas may result in the blockage of inlets and outlets to and from the wet scrubber.

As a proposed improvement to ensure complete reaction of the residual gas, an alternative conventional technique employs catalysts to breakdown the residual gas, or absorbents to absorb toxic materials or particles so that the gas expelled into the atmosphere is harmless. Such a method, however, requires complex chemical reaction processes. In addition, catalysts and absorbents are usually expensive and cannot be repeatedly used, resulting in an additional cost to the manufacturing process. Moreover, the catalysts and absorbents themselves become toxic from the process and become industrial wastes, of which cannot be easily disposed.

SUMMARY OF THE INVENTION

Accordingly, the present invention is directed to a system and method for processing residual gas that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims hereof, as well as the appended drawings.

To achieve these and other advantages, and in accordance with the purpose of the invention as embodied and broadly described, there is provided a chamber for processing residual gas that includes a residual gas inlet mechanism for receiving residual gas, at least one first gas inlet mechanism for receiving inert gas, at least one second gas inlet mechanism for receiving a reactive gas, at least one baffle for increasing a path of gas flow, and a gas outlet mechanism for outputting mixed gases from mixing the residual gas, inert gas and reactive gas and non-reacted residual gas, inert gas and reactive gas.

In one aspect of the invention, the chamber further includes a plurality of baffles for increasing a time the residual gas is in contact with the reactive gas.

In another aspect of the invention, the chamber further includes a pressure meter connected to the chamber for monitoring a pressure inside the chamber.

Also in accordance with the present invention, there is provided a system for processing residual gas that includes a chamber having at least one baffle for increasing gas flow path, a residual gas inlet mechanism connected to the chamber for supplying residual gas to the chamber, at least one first gas inlet mechanism connected to the chamber for supplying inert gas to the chamber, at least one second gas inlet mechanism connected to the chamber for supplying a reactive gas to the chamber, and a gas outlet mechanism for connected to the chamber for outputting mixed gases from mixing the residual gas, inert gas and reactive gas and non-reacted residual gas, inert gas and reactive gas.

Further in accordance with the present invention, there is provided a method for processing residual gas that includes providing a chamber, introducing residual gas into the chamber, the residual gas having a first toxic level, diluting the residual gas, introducing a reactive gas into the chamber to cause a reaction between the diluted residual gas and reactive gas to produce a mixed gas, and outputting the mixed gas from the chamber, the mixed gas having a toxic level lower than the first toxic level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

The present invention discloses a method for processing residual gas by first introducing residual gas and inert gas into a chamber to dilute the residual gas. The chamber includes one or more gas inlet mechanisms through which the residual gas and inert gas enter the chamber. A reactive gas is then introduced into the chamber through another gas inlet mechanism to mix and react with the diluted residual gas. The chamber also includes a plurality of baffles to extend the path that the gases travel in the chamber. An extended travel path increases the time in which the diluted residual gas comes into contact with the reactive gas so that as much as the residual gas is reacted as possible. The remaining gases, including the inert gas, reactive gas and residual gas that did not react, are introduced to a wet scrubber through a gas outlet mechanism.

The reaction between the residual gas and reactive gas results in powdered materials. Accordingly, in one embodiment of the invention, the chamber further includes a powder-collection apparatus at the bottom of the chamber and the powder-collection apparatus may include at least two gates. As the chemical reaction between the residual gas and reactive gas is occurring in the chamber, a first gate of the powder-collection apparatus is open to collect the resulting powders, which fall into the powder-collection apparatus due to their weight. The first gate is closed when the amount of powder collected reaches a predetermined level. A second gate is then opened to remove the powders. The system of the present invention does not to be stopped during removal of the resultant powders.

The present invention provides a suitable reaction path to completely react the residual gas so that the gas subsequently exhausted into the wet scrubber has been diluted and reacted and that the gas finally exhausted into the atmosphere has a toxic level lower than the minimum safety standards. The introduction of inert gas to mix with the residual gas before the residual gas comes into contact with the reactive gas reduces the possibility of a volatile reaction. Furthermore, the residual gas only reacts with the reactive gas after it is introduced to the chamber. The present invention uses the powder-collection apparatus to collect the powders produced from the reaction. Therefore, the problem of powders blocking the inlets and outlets of the wet scrubber encountered in conventional techniques is resolved.

Figure 1:
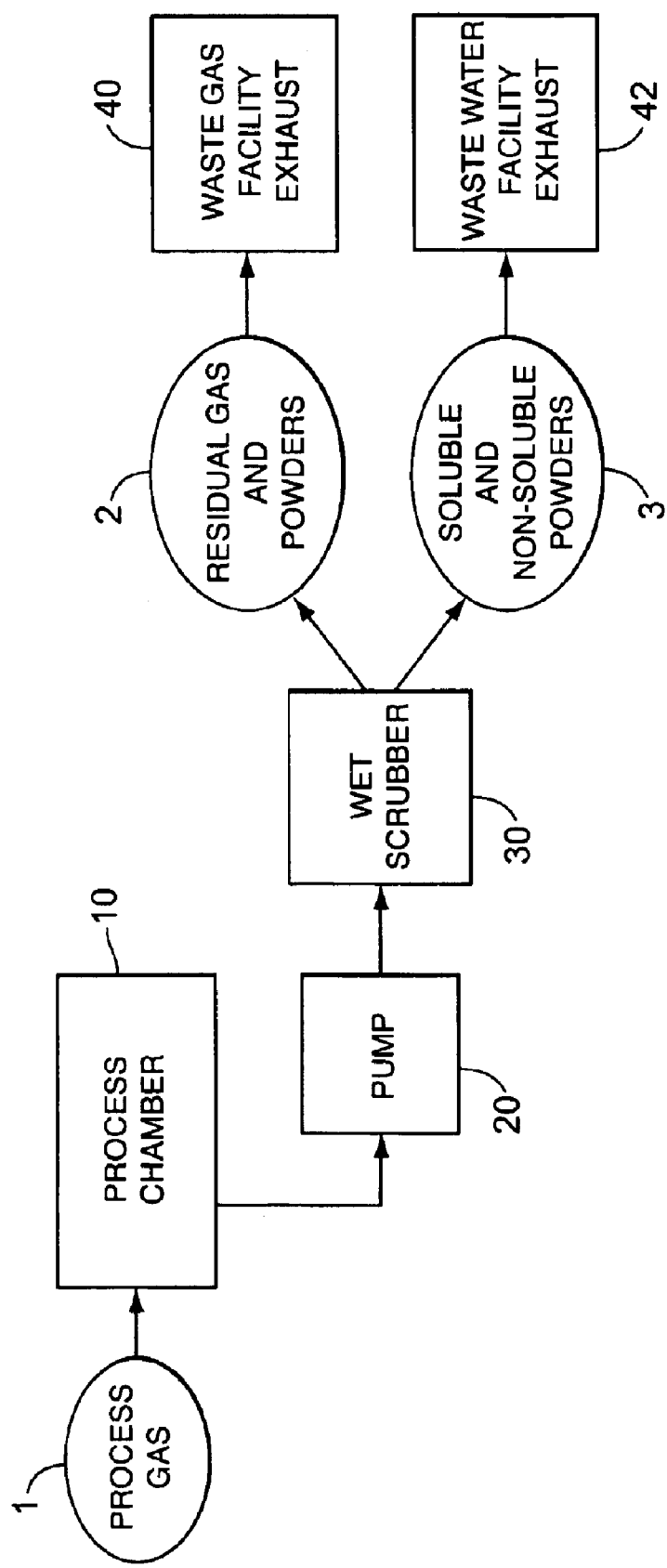
FIG. 1 shows a flow chart of a conventional process for handling residual gas in a semiconductor manufacturing process.
Figure 2:
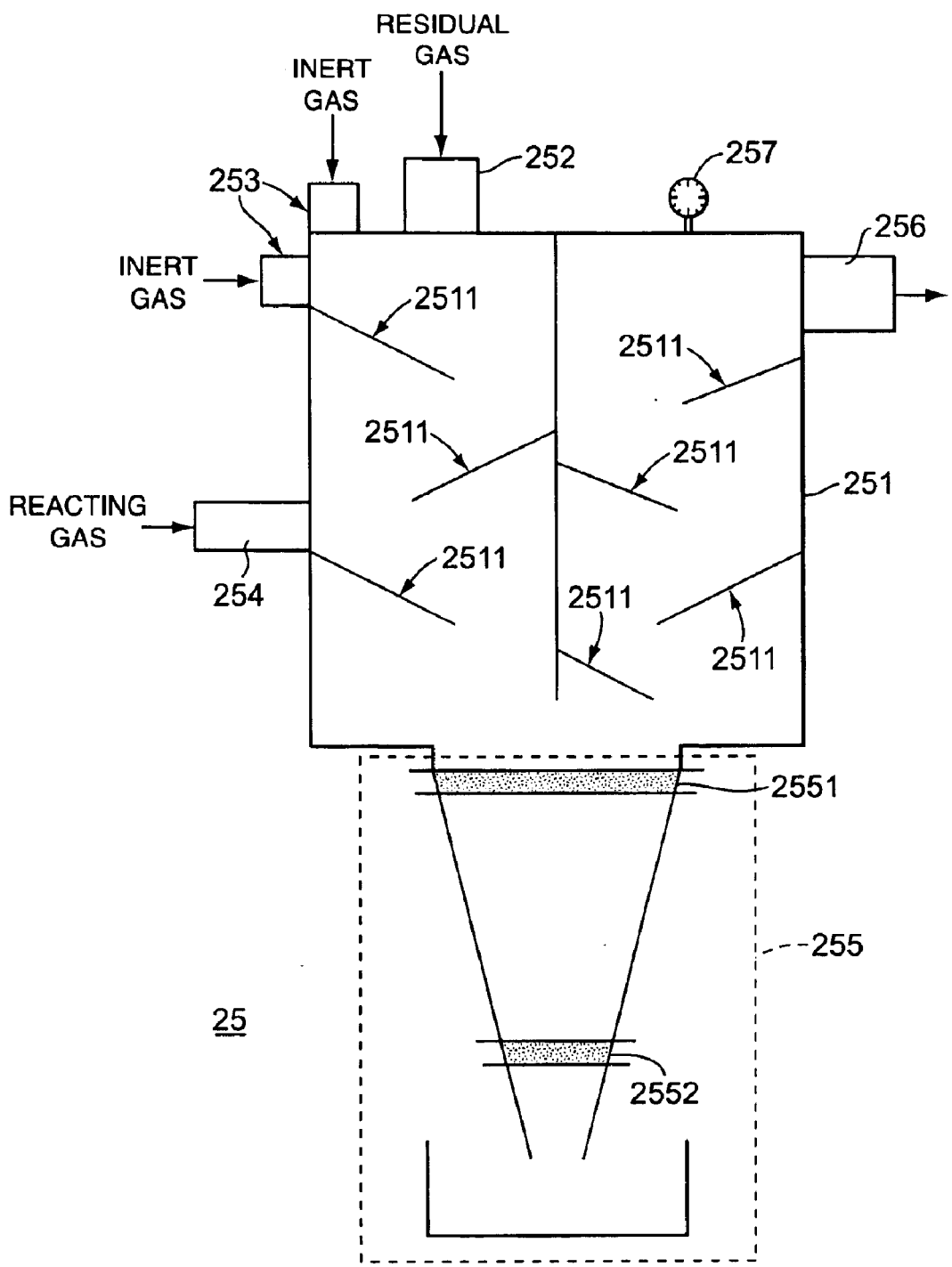
FIG. 2 is an embodiment of the system for processing residual gas in accordance with the present invention.

FIG. 2 is an embodiment of the system for processing residual gas in accordance with the present invention. Referring to FIG. 2, a residual gas process system 25 is positioned anywhere between a process chamber and wet scrubber (not shown). In a case where a pump is installed between a process chamber and wet scrubber, residual gas process system 25 is alternatively positioned between the pump and wet scrubber.

Referring to FIG. 2, residual gas process system 25 includes a chamber 251. Residual gas produced in a semiconductor process chamber, such as a CVD chamber, is introduced to chamber 251 through a residual gas inlet mechanism 252. Chamber 251 also includes one or more first gas inlet mechanisms 253. One end of the one or more first gas inlet mechanisms 253 is connected with one or more inert gas sources (not shown) to introduce inert gas into chamber 251. Because residual gas is explosive, it poses a danger during the manufacturing process. Inert gas is introduced to dilute the concentration of the residual gas to a level lower than the lowest explosion level (LEL) to secure factory safety. The one or more first gas inlet mechanisms 253 may be installed throughout chamber 251 to ensure the inert gas is sufficiently mixed with the residual gas to achieve the goal of diluting the residual gas.

Chamber 251 further includes one or more second gas inlet mechanisms 254. One end of the one or more second gas inlet mechanisms 254 is connected to one or more reactive gas sources (not shown) to introduce reactive gas into chamber 251. Chamber 251 may include one or more second gas inlet mechanisms 254 installed throughout chamber 251 to introduce a sufficient amount of reactive gas to react with most of the residual gas. Chamber 251 further includes a plurality of baffles 2511 to lengthen the path that the residual gas, inert gas and reactive gas must travel. Since the installation of the plurality of baffles 2511 lengthen the travel path of the gases, the time that the residual gas comes into contact with the reactive gas is increased. Therefore, chamber 251 can be made small and still achieve the objectives of the present invention. A smaller chamber occupies less space and requires less materials, which translate into lower cost.

The embodiment described hereinafter focuses on processing residual gas that contains silane. However, the system and method of the present invention may also be applied to processing other types residual gases. Because the residual silane gas is explosive, inert gas is added to dilute the residual gas before it comes into contact with a reactive gas, e.g., oxygen ($O_2$). The inert gas can be nitrogen gas ($N_2$). The amount of nitrogen added should not be excessive to interfere the reaction between silane and oxygen. The amount of nitrogen that should be added depends on the amount of the silane gas and the present invention provides the following calculation.

The LEL of the silane gas is 1.4% (volume percentage). However, considering the waste gas expelled from a process chamber may contain $NF_3$ or other gas, and considering the worst-case scenario, the present invention sets LEL of the mixed residual gas to be 0.5% (i.e., 5,000 ppm).

Accordingly, the amount of nitrogen that can be introduced is calculated using the following equation:

$$\frac{\text{flow amount of the residual gas } (Q_R)}{\text{total flow amount (residual gas } + N_2)(Q_T)} = 0.5\%$$

wherein $Q_T = Q_R + Q_{N2}$, and $Q_{N2}$ is the flow amount of the nitrogen gas;

$$\frac{Q_R}{Q_T} = \frac{5}{1000} = \frac{1}{200}$$

200 $Q_R = Q_T = Q_R + Q_{N2}$;
therefore $Q_{N2} = 199\ Q_R$

In this example, assuming $Q_{N2} \approx 200\ Q_R$, when the flow amount of the residual gas is 500 sccm, then the amount of $Q_{N2}$ is 500 sccm×200=100 LPM. A reactive gas, clean dry air (CDA), introduced subsequently also contains nitrogen, and the amount of nitrogen calculated in this embodiment is sufficient.

In another embodiment of the present invention, CDA is used as a reactive gas. Generally, CDA provides oxygen to react with the silane gas. Although heat does not need to be added in this embodiment, a large amount of oxygen will sufficiently react with most of the silane gas. Therefore, in theory, a higher amount of CDA is preferred. However, there is a maximum amount of CDA that can be used. Assuming residual gas process system 25 includes a wet scrubber having a volume of 200 LPM, referring to the aforementioned calculations, where $(Q_{N2}+Q_R) \approx 100$ LPM, then $$Q_{CDA} + Q_{N2} + Q_R = 200\text{ LPM}$$
$$Q_{CDA} = 200\text{ LPM} - (Q_{N2} + Q_R)$$
$$= 100\text{ LPM}$$

According to the above calculations, the amount of nitrogen and CDA can be precisely calculated. Further, in an alternative embodiment in accordance with the present invention, to reduce the cost of processing residual gas, air may be used to replace CDA as the reactive gas to decrease the cost of processing residual gas.

Referring again to FIG. 2, after the residual gas is introduced to chamber 251 and reacts with the reactive gas, powdered residues from the reaction will fall to the bottom of chamber 251 into a powder-collection apparatus 255. The powdered residues from the reaction of silane and oxygen are $SiO_2$, white in color, often accumulate and clog the inlets and outlets of equipment, such as a wet scrubber. In accordance with the present invention, the residual gas only comes into contact with the reactive gas after the residual gas enters the process chamber, thereby eliminating any possibility of having residues accumulate in the inlets and outlets.

In addition, residue powders accumulate rapidly during reaction of the residual gas and reactive gas, powder-collection apparatus 255 needs to be constantly emptied by an operator. In accordance with an embodiment of the present invention, powder-collection apparatus 255 includes at least two gates 2551 and 2552. When residual gas process system 25 is in operation, upper gate 2551 is open to collect the residue powders and lower gate 2552 is closed so that the collected residue powders do not fall through powder-collection apparatus 255. After a predetermined amount of time, a substantial amount of the residue powders have been collected by powder-collection apparatus 255, upper gate 2511 is closed and lower gate 2552 is then triggered to open by the weight of the residue powders so that the residue powders may be removed. During the removal process, lower gate 2552 is closed and upper gate 2551 is again opened to continue collecting the residue powders. An advantage of the present invention is that the system does not need to be shut down during the removal process with precise control with the opening and closing of gates 2551 and 2552.

The residue gas, after having been diluted with the inert gas and reacted with the reactive gas, is expelled with the other gases from a gas outlet mechanism 256. As described above, one end of gas outlet mechanism 256 is connected to a wet scrubber. The resulting mixed gas is then expelled to the wet scrubber and processed in the wet scrubber. The processed mixed gas then becomes waste gas and is expelled into the atmosphere. The waste gas, however, has a toxicity level lower than the minimum safety standards.

In another embodiment of the present invention, there includes a pressure meter 257 mounted on chamber 251 to monitor the air pressure in chamber 251 to avoid dangers caused by excessive pressure.

Yet another embodiment of the present invention includes a water-cooling pipe surrounding residual gas processing system 25. Since the reaction between silane and oxygen dissipate a lot of heat, the water-cooling pipe helps to cool residual gas processing system 25 to reduce any danger associated with excessively high temperatures.

Figure 3:
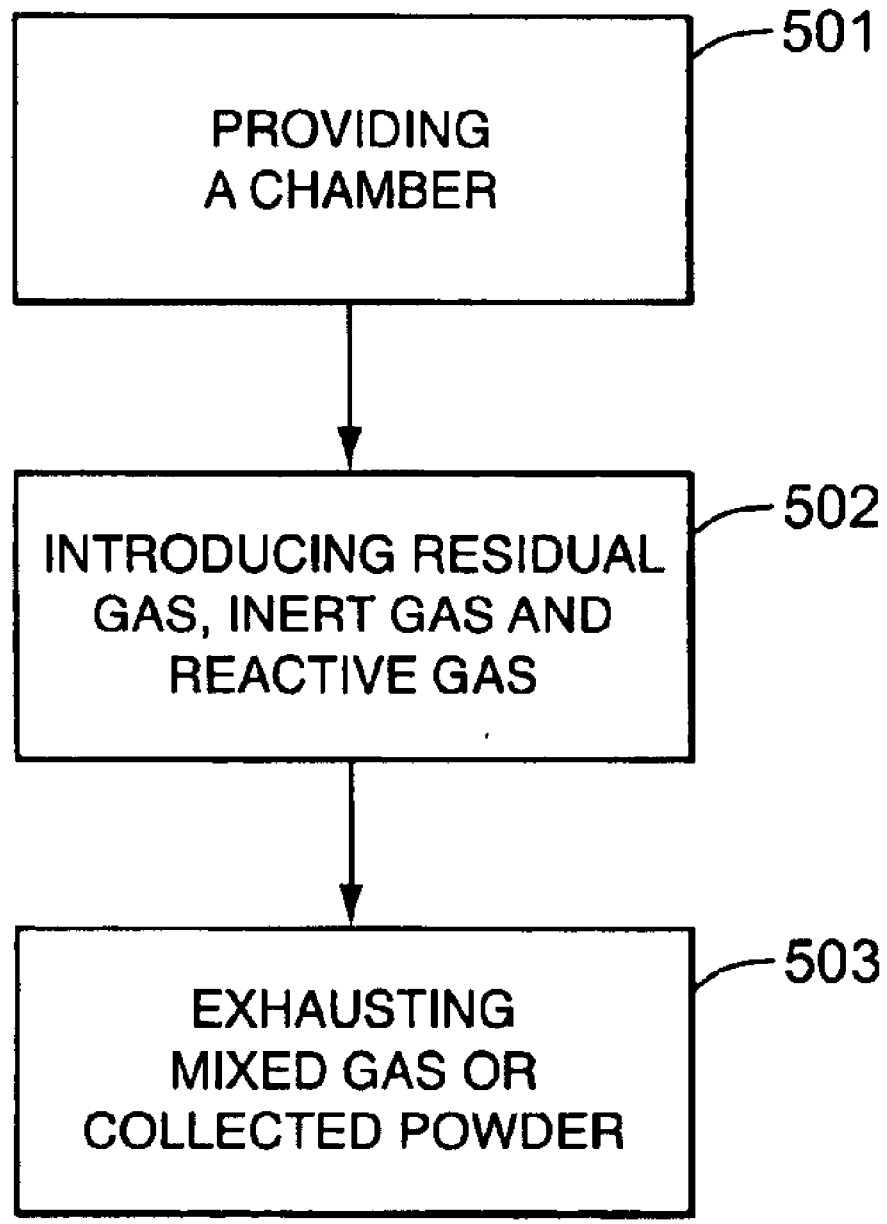
FIG. 3 shows a flow chart of a method for processing residual gas in accordance with the present invention.

FIG. 3 shows a flow chart of a method for processing residual gas in accordance with the present invention. Referring to FIG. 3, at step 501, a chamber of the present invention is provided. At step 502, residual gas and inert gas are introduced to the chamber so that the residual gas and the inert gas are mixed to dilute the residual gas. A reactive gas is then introduced to the chamber to react with the residual gas. After the reaction, at step 503, the reacted residual gas, inert gas and non-reacted residual gas are all expelled from the chamber. Alternatively, a powder-collection apparatus is provided at step 503 to collect powdered residues from the chemical reaction between the residual gas and reactive gas.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A chamber for processing residual gas, comprising:
   a residual gas inlet mechanism for receiving residual gas;
   at least one first gas inlet mechanism for receiving inert gas;
   at least one second gas inlet mechanism for receiving a reactive gas;
   at least one planar baffle for increasing a path of gas flow;
   a gas outlet mechanism for outputting mixed gases from mixing the residual gas, inert gas, and reactive gas;
   a water-cooled pipe for reducing heat resulting from an operation of the chamber; and
   a powder-collection apparatus coupled to the chamber via a first gate and a second gate, wherein, during an operation of the chamber, said first gate and said second gate collectively operate to allow continuous removal of powder from the powder-collection apparatus without interruption of the operation of the chamber.

2. The chamber as claimed in claim 1, wherein the inert gas includes nitrogen.

3. The chamber as claimed in claim 1, wherein the reactive gas is clean dry air.

4. The chamber as claimed in claim 1 further comprising a wet scrubber connected to the chamber.

5. The chamber as claimed in claim 4, wherein one end of the gas outlet mechanism connects with the wet scrubber.

6. The chamber as claimed in claim 1 further comprising a plurality of baffles for increasing a time the residual gas is in contact with the reactive gas.

7. The system as claimed in claim 1, further comprising a pressure meter connected to the chamber for monitoring a pressure inside the chamber.

8. A system for processing residual gas, comprising:

a chamber having at least one planar baffle for increasing gas flow path;

a residual gas inlet mechanism connected to the chamber for supplying residual gas to the chamber;

at least one first gas inlet mechanism connected to the chamber for supplying inert gas to the chamber;

at least one second gas inlet mechanism connected to the chamber for supplying a reactive gas to the chamber;

a gas outlet mechanism connected to the chamber for outputting mixed gases from mixing the residual gas, inert gas, and reactive gas and non-reacted residual gas, inert gas, and reactive gas; and a powder-collection apparatus coupled to the chamber via a first gate and a second gate for continuous removal of powder from the powder-collection apparatus during an operation of the chamber without interrupting the operation by collective operation of said first gate and said second gate.

9. The system as claimed in claim 8 further comprising a wet scrubber connected to the chamber.

* * * * *